US008246438B2

(12) United States Patent
Ghaly

(10) Patent No.: US 8,246,438 B2

(45) Date of Patent: Aug. 21, 2012

(54) SLOT MACHINE AND METHOD FOR A GAME RELOCATING SYMBOLS TO FINAL SYMBOL POSITIONS ON A DISPLAY AREA

(76) Inventor: Nabil N. Ghaly, South Huntington, NY (US)

( * ) Notice: Subject to any disclaimer, the term of this patent is extended or adjusted under 35 U.S.C. 154(b) by 817 days.

(21) Appl. No.: 11/899,946

(22) Filed: Sep. 10, 2007

(65) Prior Publication Data

US 2009/0069064 A1 Mar. 12, 2009

(51) Int. Cl.

| | |
|---|---|
| ***G06F 17/00*** | (2006.01) |
| ***G06F 19/00*** | (2006.01) |
| ***A63F 9/24*** | (2006.01) |
| ***A63F 13/00*** | (2006.01) |

(52) U.S. Cl. ........................................ 463/20; 463/16

(58) Field of Classification Search .................... 463/25, 463/16–20, 29

See application file for complete search history.

(56) References Cited

U.S. PATENT DOCUMENTS

| | | | | |
|---|---|---|---|---|
| 5,100,137 | A * | 3/1992 | Fulton | 463/13 |
| 5,704,835 | A * | 1/1998 | Dietz, II | 463/20 |
| 5,720,662 | A * | 2/1998 | Holmes et al. | 463/20 |
| 5,816,915 | A * | 10/1998 | Kadlic | 463/13 |
| 6,093,102 | A * | 7/2000 | Bennett | 463/20 |
| 6,273,424 | B1 * | 8/2001 | Breeding | 273/292 |
| 6,454,266 | B1 * | 9/2002 | Breeding et al. | 273/292 |
| 6,464,581 | B1 * | 10/2002 | Yoseloff et al. | 463/20 |
| 6,589,114 | B2 * | 7/2003 | Rose | 463/20 |
| 6,746,329 | B1 * | 6/2004 | Duhamel | 463/20 |
| 6,855,054 | B2 * | 2/2005 | White et al. | 463/21 |
| 7,431,647 | B1 * | 10/2008 | Marks et al. | 463/20 |
| 7,578,735 | B2 * | 8/2009 | Frizzell et al. | 463/20 |
| 7,578,737 | B2 * | 8/2009 | Cregan et al. | 463/20 |
| 7,614,946 | B2 * | 11/2009 | Nicely | 463/13 |
| 7,690,985 | B1 * | 4/2010 | Muskin et al. | 463/20 |
| 7,744,455 | B2 * | 6/2010 | Aida | 463/16 |
| 2003/0092480 | A1 * | 5/2003 | White et al. | 463/20 |
| 2003/0104855 | A1 * | 6/2003 | McClintic | 463/16 |
| 2003/0125102 | A1 * | 7/2003 | Cannon | 463/20 |
| 2003/0176216 | A1 * | 9/2003 | Storey | 463/25 |
| 2004/0033829 | A1 * | 2/2004 | Pacey et al. | 463/20 |
| 2004/0048646 | A1 * | 3/2004 | Visocnik | 463/16 |
| 2004/0072603 | A1 * | 4/2004 | Shuster | 463/16 |
| 2004/0097280 | A1 * | 5/2004 | Gauselmann | 463/16 |
| 2005/0054420 | A1 * | 3/2005 | Cregan et al. | 463/20 |
| 2005/0054436 | A1 * | 3/2005 | Frizzell et al. | 463/25 |
| 2005/0124406 | A1 * | 6/2005 | Cannon | 463/20 |
| 2005/0197182 | A1 * | 9/2005 | Duhamel | 463/22 |
| 2006/0160595 | A1 * | 7/2006 | Gerson et al. | 463/16 |
| 2006/0189376 | A1 * | 8/2006 | Hornik et al. | 463/20 |
| 2008/0051178 | A1 * | 2/2008 | Okada | 463/20 |
| 2008/0146311 | A1 * | 6/2008 | Walker et al. | 463/20 |
| 2008/0161095 | A1 * | 7/2008 | Patterson et al. | 463/20 |
| 2008/0176629 | A1 * | 7/2008 | Okada | 463/20 |
| 2008/0176639 | A1 * | 7/2008 | Okada | 463/25 |
| 2008/0176641 | A1 * | 7/2008 | Okada | 463/25 |
| 2009/0088242 | A1 * | 4/2009 | Richardson | 463/25 |

* cited by examiner

*Primary Examiner* — Milap Shah

(57) ABSTRACT

A gaming device method and apparatus are disclosed, and are accomplished by a slot machine that provides the result of a spin, or a game, to the player in two steps. In the first step, the machine provides partial, or incomplete information related to the occurring symbols during a game. The player is permitted to place, or change, his or her wager after said partial or incomplete information is made visible to the player. Upon depositing, or increasing a wager, the machine provides the complete result of a spin to the player, and a win determination is made.

21 Claims, 9 Drawing Sheets

EXAMPLE OF BONUS CONDITION

SLOT MACHINE AND METHOD FOR A GAME RELOCATING SYMBOLS TO FINAL SYMBOL POSITIONS ON A DISPLAY AREA

This Utility application benefits from provisional application of U.S. Ser. No. 60/840,921 filed on Aug. 30, 2006.

BACKGROUND OF THE INVENTION

This invention relates generally to slot machines, also known as coin operated gaming machines, and more specifically to a new category of slot machines that enables a player to place a wager, or to change his or her wager, after an initial display of symbols is made visible to the player.

Slot machines are well known, and have been around for many years. A reel type video slot machine includes a plurality of symbols that are mapped on the periphery of a plurality of simulated rotating reels to form a playfield of n rows and m columns. The reels are randomly stopped and a win decision is made based on the combination of symbols occurring at one, or a plurality of winning lines (also known as pay lines). A new type of slot machines eliminates pay lines, and defines a winning combination based on the multiple occurrence of a symbol at any location at consecutive reels, rather than at a particular winning line that spans the reels (see U.S. Pat. No. 6,093,102). For a reel type slot machine, the number of reels employed varies from one reel per column to an individual reel for each playing position.

In the prior art of slot machines, the player is required to place a wager prior to activating a lever, or a start button that triggers the rotation of the reels. Further, the player is not permitted to increase said wager after the reels come to a complete stop, and revealing the occurring symbols at various pay lines or reels. When the reels come to a complete stop, a controller within the machine makes a determination if a winning outcome has occurred.

The current invention is related to a new category of slot machines, wherein a player can initiate a spin of the reels prior to placing a wager, and is permitted to place a wager, or change his or her wager, after the reels come to a complete stop. The player is provided with information on the specific symbols that occurred at the various playing positions after the stopping of the reels. However, the actual positions of symbols relative to winning lines, or reels, are hidden from the player, and are only made visible after the player has deposited the required wager. Alternatively, the player is initially provided with a subset of the occurring symbols, and the remaining symbols are hidden from the player until the player has deposited the required wager.

OBJECT OF THE INVENTION

Because it is desirable to offer players new types of slot machines, it is an object of this invention to provide a slot machine that does not require a player to deposit a wager prior to activating the lever, or the start button that initiates the spinning of the reels.

It is also an object of this invention to provide slot machines that permit a player to place a wager for a particular game after the reels come to a complete stop, and after the symbols occurring at various playing positions become visible to the player.

It is still an object of the invention to provide slot machines that permit a player to change his or her wager for a particular game after the reels come to a complete stop, and after an initial display of the occurring symbols is made visible to the player.

It is a further object of this invention to provide a slot machine wherein the symbols occurring at various playing positions are scrambled to hide their positions relative to winning lines, or reels, from the player.

It is still an object of this invention to provide a slot machine wherein, upon the deposit of a wager, the actual positions of the occurring symbols relative to winning lines, or reels, are made visible to the player.

It is also an object of the current invention to provide a slot machine wherein a subset of the symbols occurring after a spin at various playing positions is initially hidden from the player, and wherein said subset of symbols is made visible to the player after the player places a wager.

It is yet an object of this invention to provide a slot machine with hidden rotating reels, and which employs a playfield defined by a plurality of playing positions, and wherein the reel symbols that occur at the various winning lines are randomly mapped to the playing positions at the playfield.

It is also an object of this invention to provide a slot machine, wherein a winning outcome includes a combination of symbols occurring at one of a plurality of winning lines.

It is a further object of this invention to provide a slot machine that does not employ winning lines, and wherein a winning outcome includes the repeated occurrence of a particular symbol at contiguous reels that include the first reel.

It is still an object of this invention to provide a slot machine, wherein an initial display that includes partial information related to the occurring symbols for a particular spin is made visible to the player prior to depositing a wager, and wherein a second display that includes complete information related to said occurring symbols is revealed to the player, and a win determination is made, after a wager is deposited.

It is yet an object of this invention to provide a slot machine, which provides the player with an initial display that includes a subset of the symbols occurring after a spin, and wherein the locations of the symbols in said subset are randomly scrambled, and wherein a second display that includes all occurring symbols at their actual positions is made visible to the player after depositing a wager.

It is a further object of this invention to provide a slot machine, which incorporates a variety of visual and audible indications to heighten the enjoyment of play.

SUMMARY OF THE INVENTION

The foregoing and other objects of the invention are accomplished by a slot machine that has a playfield that includes a plurality of playing positions, wherein each playing position has an indicator to display one of a plurality of symbols. It is preferable that the playfield is arranged as an array of n rows, and m columns. Each column could be implemented using a single reel. Alternatively, when independently randomly achieved playing positions are desired, each playing position is implemented using a pseudo spinning wheel. Typically in traditional slot machines, n=3, and m=3, 4 or 5.

The current invention is applicable to slot machines that employ winning lines, as well as to slot machines, wherein a win outcome is based on the multiple occurrences of symbols at contiguous columns that include the first column. The main concept of this invention is to provide the display resulting from a spin in two steps. First, a partial and/or scrambled display of the occurring symbols after a spin is made visible to the player. Second, after placing a wager, the complete display of said occurring symbols is restored, and a win determination is made. For example, the initial display could be generated by randomly scrambling the locations of the occurring symbols after a spin, and presenting the occurring symbols to the player at the scrambled locations. In a second example, the initial display includes a random subset of the symbols occurring after a spin, while the remaining symbols are hidden from the player until a wager is deposited. This two step approach does not change the odds of a winning outcome for a particular spin. However, a player has an opportunity to skip one, or a plurality of spins if the player believes that the initial display will not result in a winning outcome. This would make such machines popular, and in turn would result in increased revenues for game operators.

In accordance with a preferred embodiment of the invention, a reel type video slot machine is provided, and includes a screen with a playfield that consists of fifteen playing positions. The playfield is implemented using five (5) virtual rotating reels, with three (3) positions per reel. The preferred embodiment also employs five (5) winning lines that include three (3) horizontal lines, and two diagonal lines. Similar to traditional slot machines, the slot machine provided in the preferred embodiment includes a microprocessor with associated control program, as well as a plurality of input controls to enable a player to operate the machine.

The preferred embodiment, also, includes a screen to present game information to the player. The screen could be of the Cathode Ray Tube (CRT) type, or of the Liquid Crystal Display (LCD) type. As would be appreciated by a person skilled in the art, a designer could also use a Digital Light Processor (DLP) screen, or a plasma screen to implement this slot machine.

Unlike traditional slot machines, the player can initiate a spin without first depositing a wager. The player can initiate a spin by activating either the main lever, or the start button for the machine. Alternatively, the microprocessor could be programmed to initiate periodic automatic spins to attract attention to the machine. After the reels come to a complete stop, the microprocessor randomly scrambles the positions of the occurring symbols at the five winning lines. This is done by randomly mapping the actual positions of the occurring symbols into apparent positions of the symbols to form an initial display that will be presented to the player. The player then deposits a wager if he or she has decided to continue with the game. Upon depositing a wager, the microprocessor restores the original locations of the occurring symbols, provides a second display based on said original locations to the player, and makes a determination if a win has occurred.

It should be noted that the initial display presented to the player could be based on a subset of the symbols occurring after a spin, rather than on the scrambled display described above. In such a case, the remaining symbols are made visible to the player, and a win determination is made after the player has deposited a wager.

In accordance with an alternate embodiment of the invention, a reel type slot machine that dos not employ winning lines is provided. The machine functions in a similar manner to the one described in the preferred embodiment. An initial scrambled display is presented to the player, and the player makes a determination to continue with the game by depositing a required wager. After a wager is deposited, the microprocessor restores the original display, and makes a win determination based on the multiple occurrences of symbols at any playing positions in adjacent columns.

BRIEF DESCRIPTION OF THE DRAWINGS

These and other more detailed and specific objectives will be disclosed in the course of the following description taken in conjunction with the accompanying drawings wherein.

DESCRIPTION OF THE PREFERRED EMBODIMENT

Figure 1:
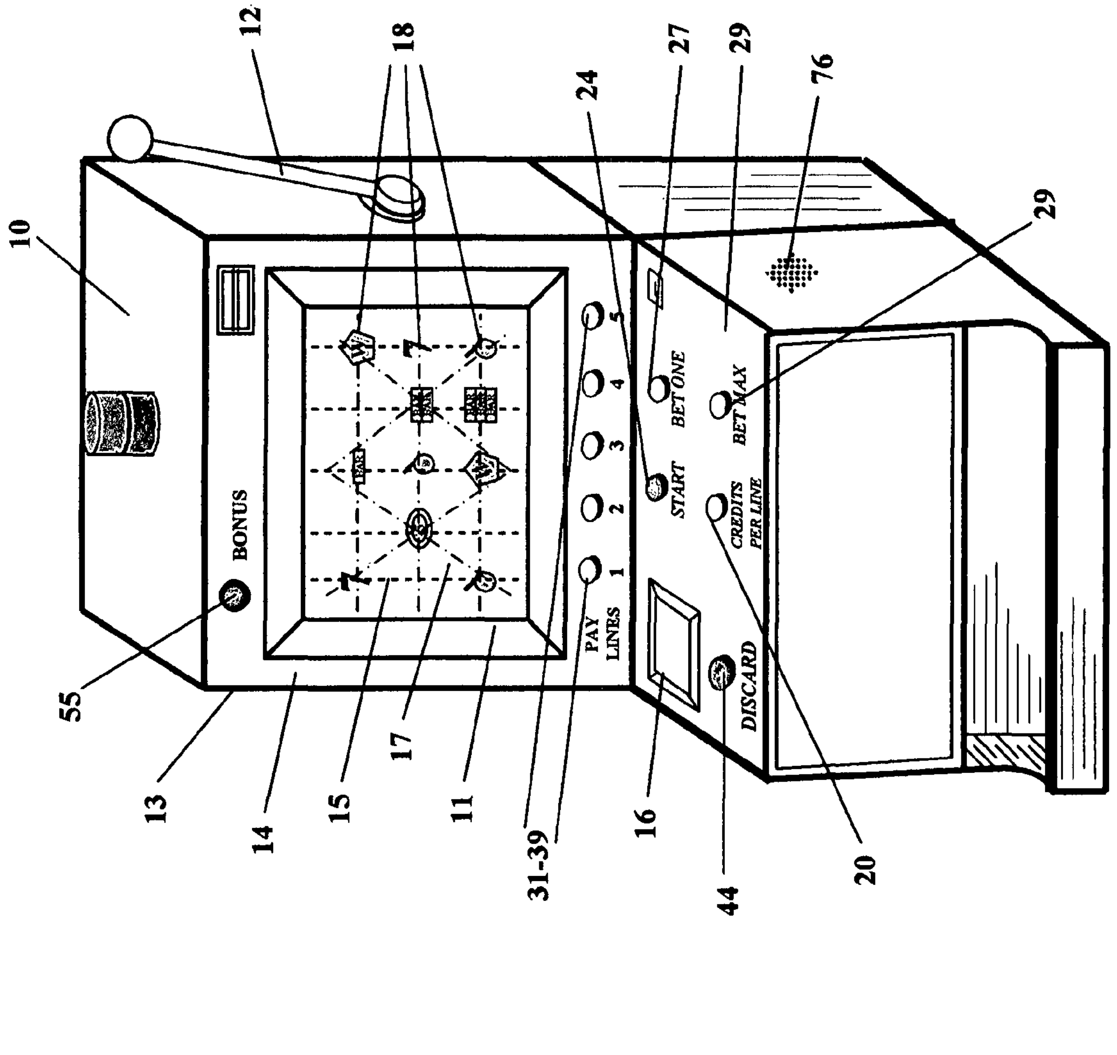
FIG. 1 is a perspective view of the preferred embodiment of a slot machine according to the invention.

Referring now to the drawings where the illustrations are for the purpose of describing the preferred embodiment of the invention, and are not intended to limit the invention hereto, FIG. 1 is a front prospective view of a slot machine 10, which is comprised of a housing 13 having a face 14 and a video screen 11 that provides a graphic display of five rotating reels 15. The size of the screen is such that at least three positions 18 on each reel are visible to the player. Overall, the symbols at fifteen playing positions are indicated on the screen. The preferred embodiment provides a total of five (5) winning lines 17, which could be marked on the external surface of the screen. The slot machine 10, also, has conventional controls including an activation lever 12, a start button 24, winning line selection and activation buttons 31, 33, 35, 37 & 39, "BET ONE" 27, "BET MAX" 29 and "CREDITS PER LINE" 20 buttons. Further, the preferred embodiment includes a Liquid Crystal Display (LCD) screen 16, which provides the player with game information, including the number of lines selected, credits per line, number of credits won, and balance of remaining credit. In addition, the preferred embodiment employs a "DISCARD" switch 44 to enable a player to reject an initial display of symbols, and to start a new game. Also, the preferred embodiment includes a bonus win indicator 55, which indicates to the player his or her eligibility for a bonus win as described herein.

Upon the activation of either the main lever 12, or the start button 24, and prior to placing a wager, the microprocessor, under the direction of the control program, initiates the spinning of the reels 15. Then when the reels come to a complete stop, the microprocessor, under the direction of the control program, scrambles the locations of symbols occurring at the winning lines 17. If the player decides to continue with the game, then he or she is required to make a bet. Similar to traditional slot machines a bet is based on the number of lines selected, and the amount of wager per line. The player uses the pay line selection and activation buttons 31, 33, 35, 37 & 39 to select the active pay lines. The player could also use the "BET ONE" button 27, "CREDITS PER LINE" button 20, and/or "BET MAX" button 29 to place the wager for the selected lines. Alternatively, the player can activate the "DISCARD" button 44, to reject the current spin and initiate a new game.

It should be noted that the above disclosed operation is provided for the purpose of describing the preferred embodiment, and is not intended to limit the invention hereto. As would be appreciated by a person skilled in the art a variation of the above described operation could include requiring the player to deposit a partial, or a reduced wager prior to the spinning of the reels. The player would then have a choice after the reels come to a complete stop to either continue with the game by depositing the remaining wager for the bet made, or to reject the spin by activating the "DISCARD" button 44.

A second variation is to require the player to deposit a wager prior to spinning the reels, and to permit the player to increase his or her bet up to the maximum permitted after the reels come to a complete stop. Alternatively, the player can reject the spin, and lose the wager. Other variations could include allowing a player to deposit a wager prior to the initiation of a spin, then permitting the player to withdraw or reduce the wager after the reels come to a complete stop.

It should, also, be noted that the use of a random process to scramble the locations of the original symbols, and to provide an initial display to the player that includes the occurring symbols, but not their actual locations, is being disclosed for the purpose of describing the preferred embodiment, and is not intended to limit the invention herein. As would be appreciated by one skilled in the art, the initial display could include a subset of the occurring symbols either at their actual locations, or at randomized locations. In such a case, upon depositing a wager, the remaining occurring symbols are made visible to the player.

Figure 9:
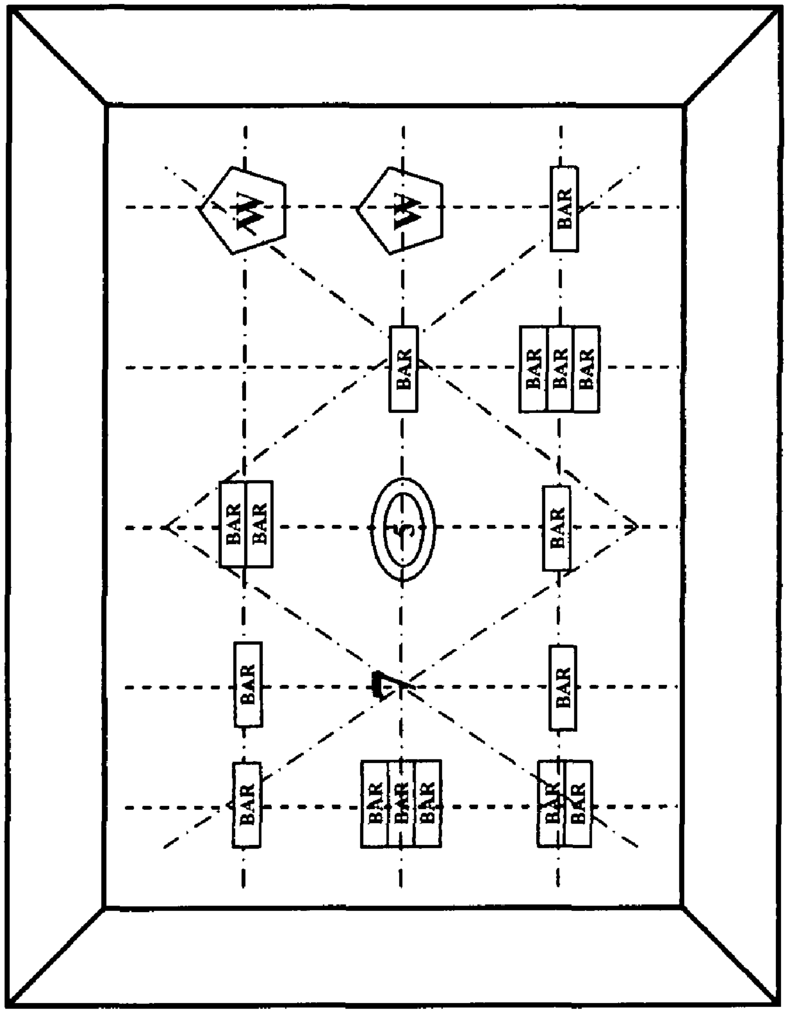
FIG. 9 provides an example of a bonus win condition, wherein a player will ascertain that at least one winning combination of symbols has occurred in the original display regardless of the result of the random process to change the locations of the occurring symbols.

If an algorithm to scramble the locations of the occurring symbols is used, then it is possible that the initial display shows erroneous winning combination of symbols, while the original display does not include such winning combinations, and vice versa. It is also possible that neither display includes a winning combination, or that both displays include a winning combination. In most cases, and because the locations of the symbols in the initial display are randomized, the player is not able to ascertain if the initial display will result in winning combinations of symbols. However, it is possible for certain slot machines that the symbols occurring at the 15 playing positions include a large number of symbols that could form winning combinations. For example, if a machine employs a set of symbols that includes "BAR," "DOUBLE BAR," "TRIPPLE BAR," "WILD," and a "FIVE" multiplier, and if the occurring symbols at the 15 playing positions include a large number of these symbols, then irrespective of the randomization process it could be obvious to a player that the initial display will result in at least one winning combination. In such a case, the player is awarded a bonus win without depositing a wager provided that he or she is qualified for such bonus win. An example of a bonus win is demonstrated in FIG. 9.

To qualify for a bonus win, the player must have a credit balance in the machine, and must have a history of an average bet for the machine that meets or, exceeds a minimum threshold over a pre-determined period of time. The preferred embodiment includes an indicator 55 to inform the player if he or she is qualified for bonus wins. If a bonus win condition occurs at a time when the player is not qualified for it, then the spin will be automatically discarded. However, the player is informed of such bonus win.

Figure 6:
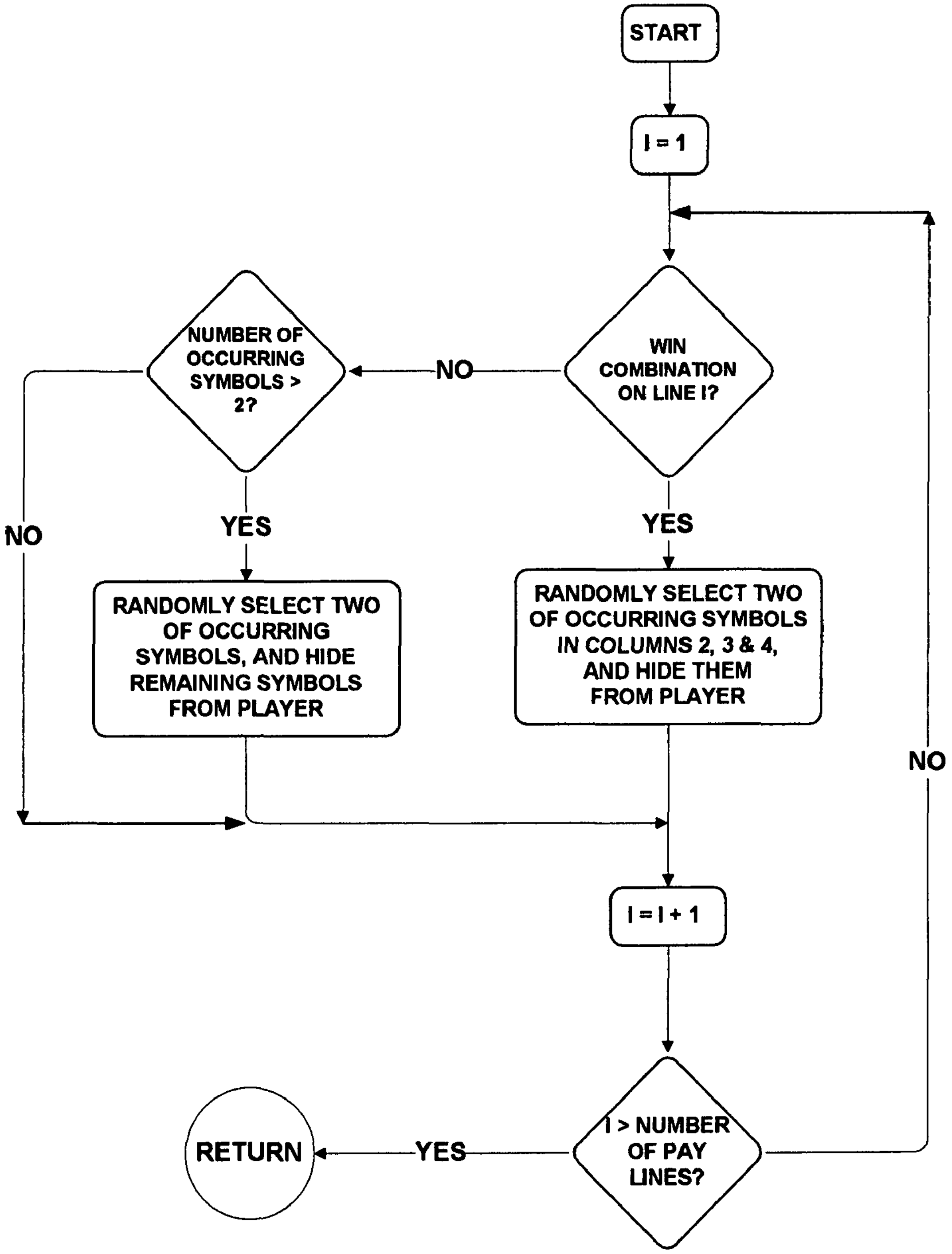
FIG. 6 indicates an example of logical flow diagram for a subroutine that illustrates the program steps performed by the processor to randomly select a subset of the occurring symbols during a game.

Alternatively, if an algorithm to hide a subset of the occurring symbols is used then such algorithm could be designed to ensure that the subset of occurring symbols that is made visible to the player does not include any winning combinations of symbols. A simple example of such algorithm is to always hide all occurring symbols at the first, second or third column. A person skilled in the art would appreciate that there exists many algorithms, including random algorithms, which could be designed to hide a subset of the occurring symbols such that the remaining symbols do not include winning combinations. An example of a random algorithm to hide occurring symbols is shown in FIG. 6. Further, a game designer could employ an algorithm that hides a subset of the occurring symbols as well as scramble the locations of the remaining visible symbols. In addition, a game designer could employ an algorithm that hides a subset of the occurring symbols, and also adds a plurality of superfluous symbols. Also, the hidden subset of symbols could be substituted by different symbols at the initial display. In such case, part of the displayed symbols is accurate, while the remaining visible symbols are superfluous.

Accordingly, the main general concept of this invention is based on providing partial information to the player about the results of a particular spin, either prior to depositing a wager for the spin, or after depositing a reduced wager that could be increased by the player after the reels come to a complete stop. The player has the option of either to continue with the spin by depositing a wager or increasing his or her wager, or to reject the spin by activating the "DISCARD" button 44. Upon placing or increasing a wager, the complete and accurate information related to the spin is made visible to the player, and a win determination is made.

Figure 2:
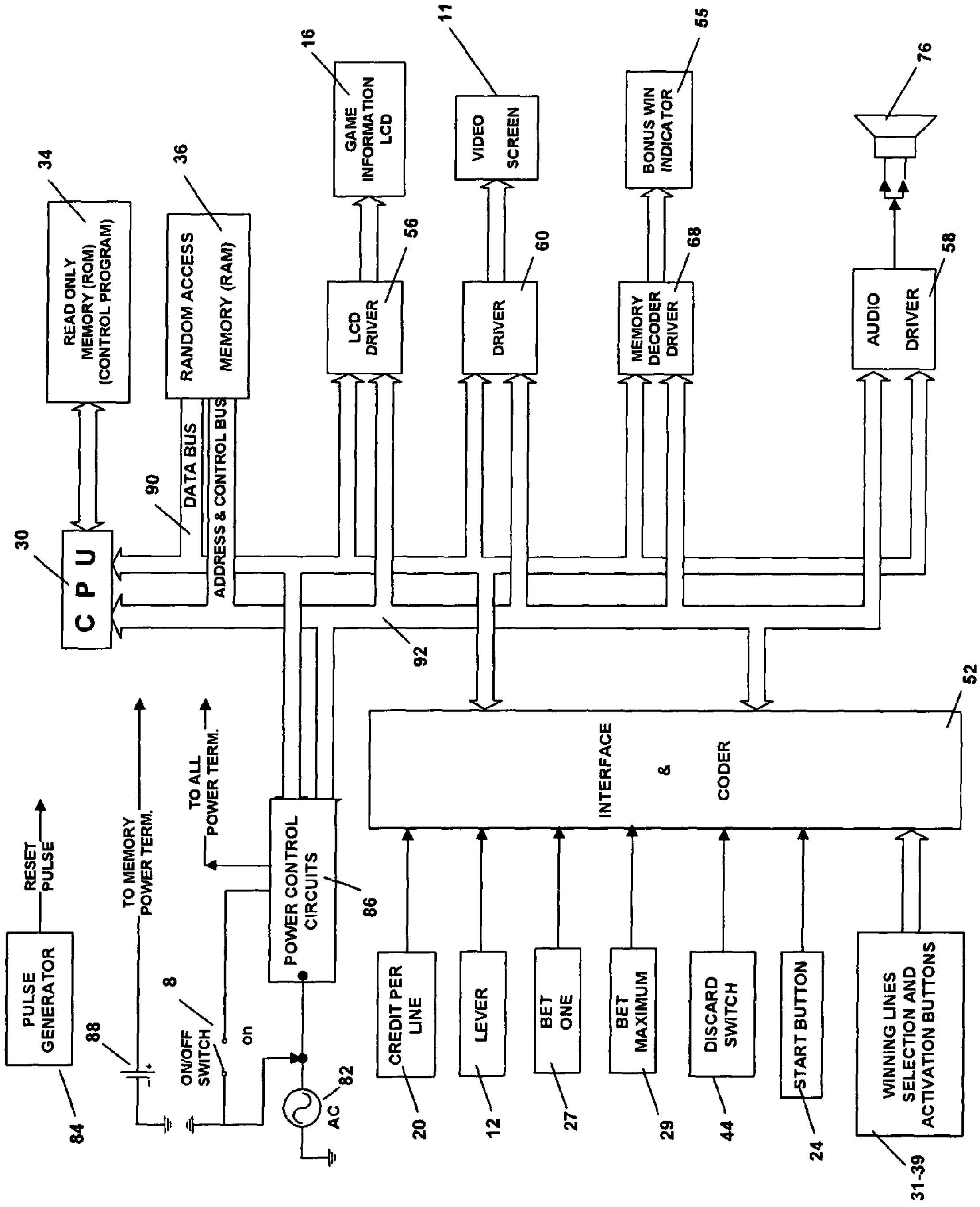
FIG. 2 indicates a block diagram of the microprocessor circuitry used to control the slot machine according to the invention.

A block diagram of the control circuitry to operate this slot machine 10 is illustrated in FIG. 2. This block diagram includes a micro-controller with a central processing unit (CPU) 30 and system memory. The system memory preferably comprises a separate read-only memory (ROM) 34 and battery-backed random-access memory (RAM) 36. It will be appreciated, however, that the system memory may be implemented on any of several alternative types of memory structures or may be implemented on a single memory structure. For example, the read-only memory 34 may be replaced or supplemented with a mass storage unit such as a removable flash memory or a hard drive. The system memory is used to store game-related data associated with the chance games played on the slot machine. The game-related data may, for example, include game code, math tables, a random number generator, and audio resources.

An on/off toggle switch 8 is provided to control the operational state of the gaming machine, and the connection of the external AC power supply 82 to the electric circuitry 86, which in turn energizes all terminals of the gaming device 10. The gaming device also includes a rechargeable battery 88, which feeds the memory power terminals in order to ensure that critical data is not lost in the event of a loss of the external electrical supply 82. Also, an interface and coding device 52 is used as an input interface between the various control elements and the CPU 30. These control elements include the main lever switch 12, the start button 24, "BET ONE" switch 27, line activation buttons 31, 33, 35, 37 & 39, "BET MAX" switch 29, "CREDITS PER LINE" switch 20, and other conventional control elements of a slot machine. Similarly an LED driver 65 is used to interface the bonus win indicator 55 with the CPU 30. Also, an LCD control driver 56 and an audio driver 58 are used to interface the LCD screen that provides game information 16, and the audio circuits that activate the loudspeaker 76 with the CPU 30. Further, an LCD driver 60 is used to interface the video screen 11 with the CPU 30. A common address and control bus 92, and a separate common data bus 90 are used to interconnect the central processing unit 30 with the interface and coding device 52, the video LCS driver 60, the LED driver 65, the LCD driver 56, the audio driver 58, the read only memory (ROM) 34, and the random access memory (RAM) 36.

To initiate a spin, the player can activate the main lever 12, or the start button 24. Alternatively, the CPU 30 could be programmed to initiate automatic spins. Also, a new spin is automatically enabled after the player terminates a current game by activating the "DISCARD" switch 44. After the reels come to a complete stop, an initial scrambled display is made visible to the player. Thereafter, if the player wishes to continue with the game then he or she may select an amount to wager via the button control panel that includes the line selection and activation buttons 31, 33, 35, 37 & 39, "BET ONE" 27, "BET MAX" 29, and "CREDITS PER LINE" 20 buttons. Alternatively, if the player elects to reject the current spin, then he or she must activate the "DISCARD" button 44. Following the deposit of a wager, the CPU 30, under the direction of the control program, executes a segment of the game code (control logic) that restores the image on the video screen 11 to the original display showing the occurring symbols at their actual locations relative to the winning lines. The CPU 30 then determines if one or more winning combinations of symbols have occurred at the activated winning lines 17. Also, the CPU 30 selectively accesses the audio resources to be played through one or more audio speakers 76 mounted to a housing of the slot machine. If the outcome after the movement of the reels corresponds to a winning combination outcome identified on a pay table, the CPU 30 instructs a payoff mechanism 55 to award the player a payoff for that winning outcome combination in the form of coins or credits.

It should be noted that the above description of the block diagram illustrated in FIG. 2, and using interface and coding devices, memory decoding devices, and/or drivers is being provided for the purpose of describing the preferred embodiment, and is not intended to limit the invention herein. As would be appreciated by a person skilled in the art, a game designer may elect to use a microprocessor that includes input and output ports to interface input switches, indicators, and output devices with the CPU. Such microprocessors are well known in the art.

Figure 3:
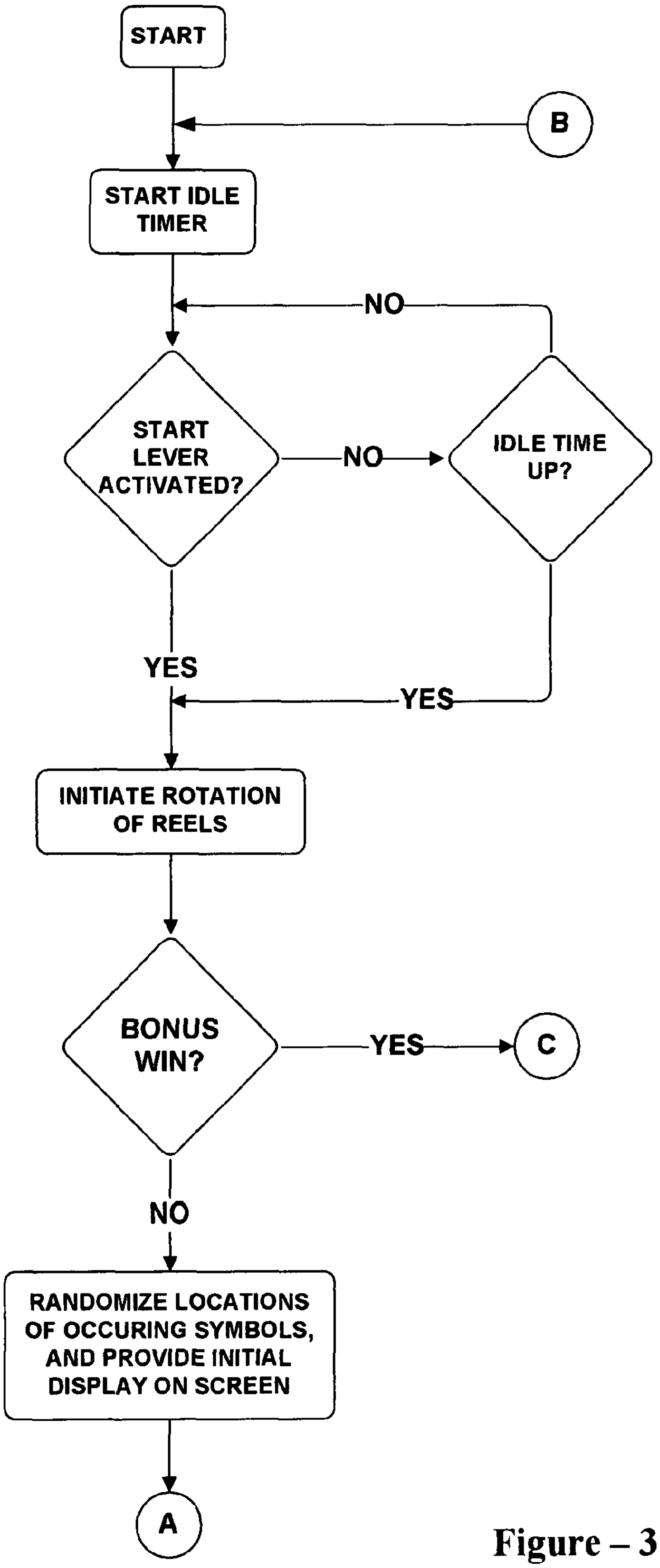
FIGS. 3-5 indicate a logical flow diagram that illustrates the main program functions performed by the microprocessor controlling the slot machine according to the invention.
Figure 4:
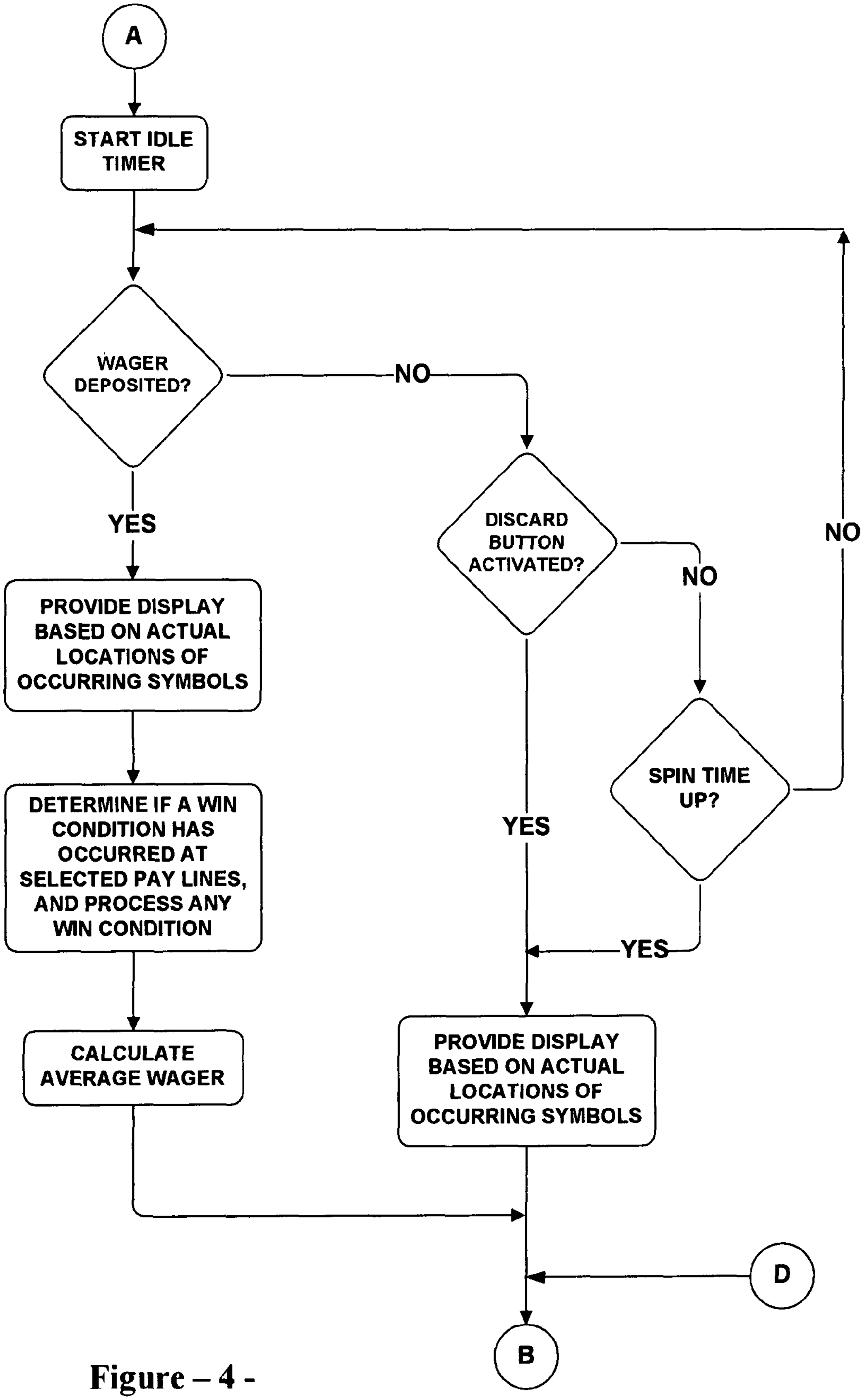
Figure 5:
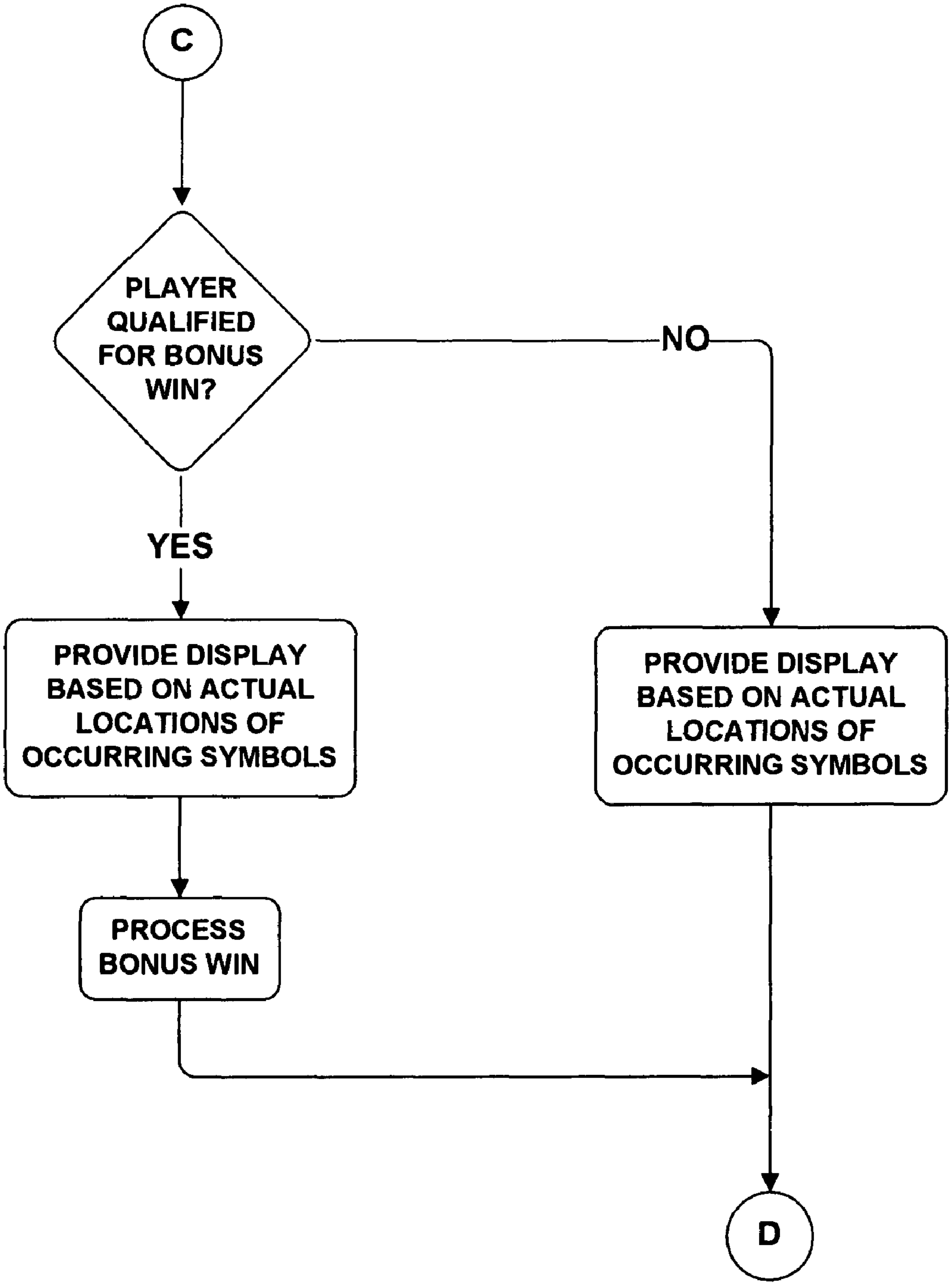
Figure 7:
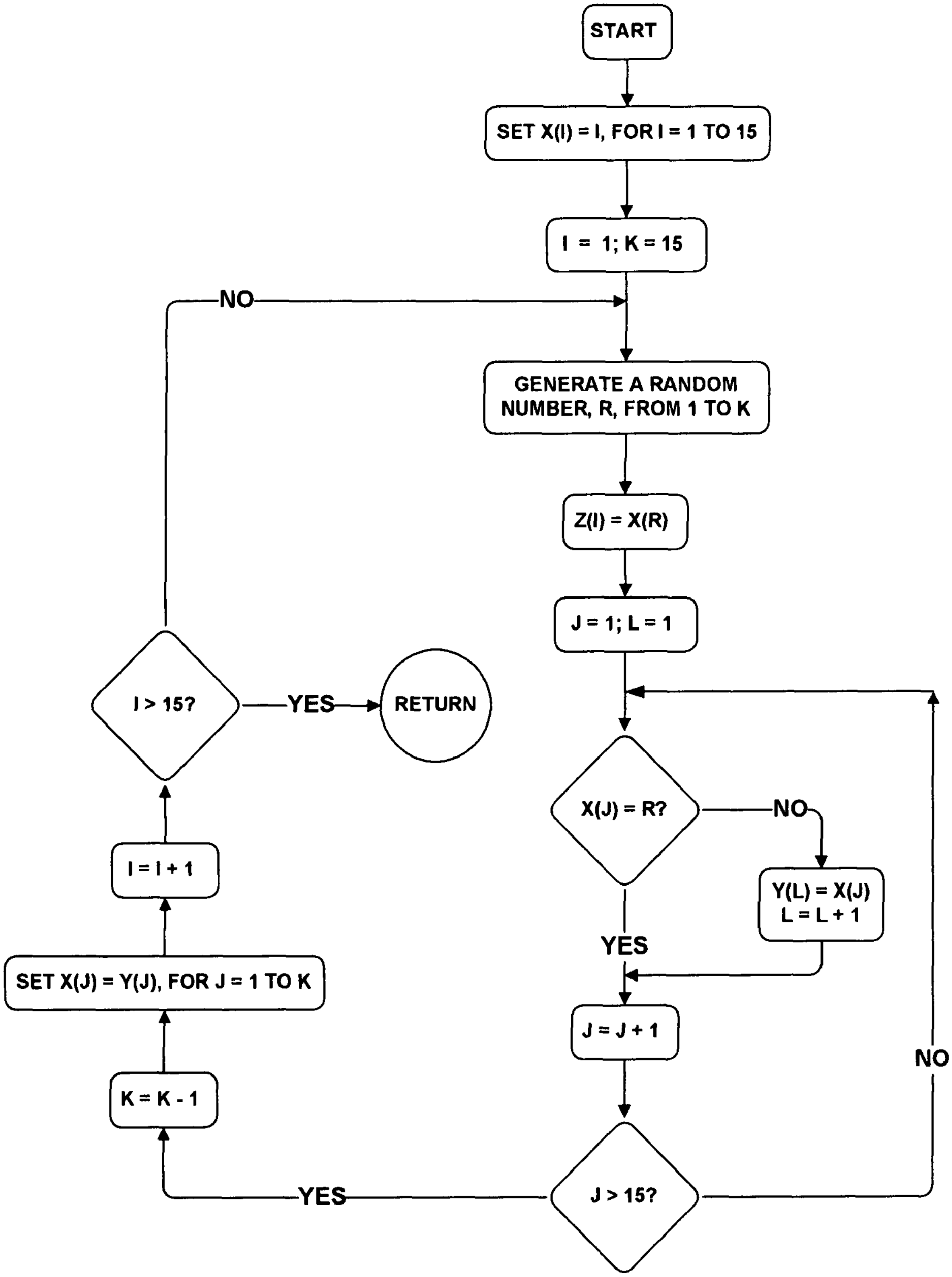
FIG. 7 indicates an example of logical flow diagram for a subroutine that illustrates the program steps performed by the processor to randomly change the locations of the occurring symbols during a game.
Figure 8:
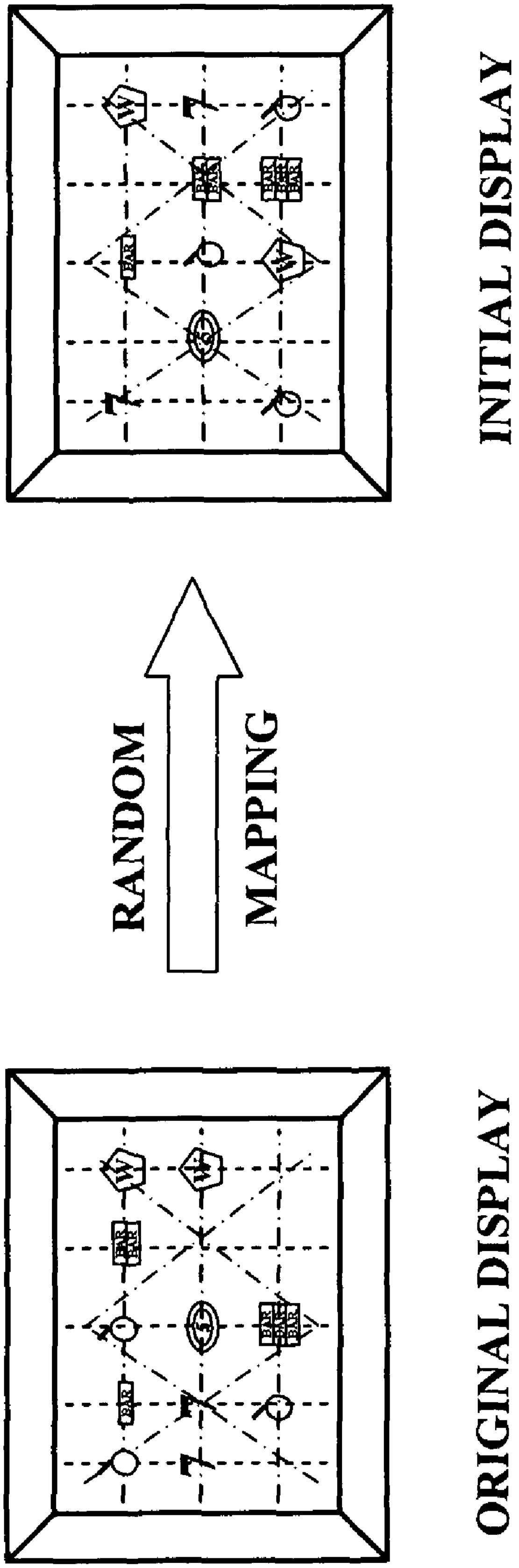
FIG. 8 demonstrates the concept of randomly mapping the original display of symbols into a first display that is initially presented to the player.

With respect to the operation of this gaming machine, the logic steps utilized are illustrated in flow diagram form in FIGS. 3-5, which interconnect with each other at the places shown in the various figures. Even though specific reference will not be made to this diagram in the following description of the operation of the slot machine, periodic reference to this diagram may prove to be helpful to the reader hereof Also, FIG. 7 provides an example of an algorithm that randomizes the locations of the occurring symbols to generate new locations for said symbols, and provide an initial display to the player. This algorithm generates a new location Z(I) for the symbol occurring at location I, for I=1 to 15 (for a 5 columns×3 rows display).

Upon the activation of the "On-Off" switch 8, and the initialization of the program variables, the slot machine is ready to operate. The player could initiate a new spin by activating the main lever 12, or the start button 24. If the machine is unattended, or if the player does not initiate a new spin, then after the elapse of a predetermined period of time, the game control logic initiates a new spin automatically. Then after the reels come to a complete stop, a control logic segment executes an algorithm that employs a random number generator to scramble the locations of the occurring symbols relative to the winning lines 17. The control program then generates an initial display on the screen 11, which show the occurring symbols at locations that could be different from their original locations relative to the winning lines.

The player is expected to activate the desired number of winning lines using the line activation buttons 31, 33, 35, 37 & 39, and to make a bet based on the number of lines selected, and the desired wager per line. Upon depositing a wager, the control program generates a new display on the screen 11 that shows all the occurring symbols at their original locations. Then the control program determines if a win combination has occurred, and processes such win combination.

Alternatively, if the player elects to reject the current spin, then he or she is expected to activate the "DISCARD" button 44. Upon such activation, the control program terminates the current game, and enables a new spin. In the event the player fails to take an action after the reels come to a complete stop, i.e. the player fails to either deposit a wager or activate the "DISCARD" button 44, then after the elapse of a predetermined period of time, the control program will automatically discard of the current game, and the cycle to initiate a new spin is repeated.

Further, the control program continuously monitors the amount of wager deposited by the player during game play to determine if the player is qualified for a bonus win. The control program calculates the average wager used by the player during a predetermined period of time (for example a five minutes period). If such average is higher than a predetermined threshold, then the control program activates the bonus win indicator 55. Once activated, the control program will continue to calculate the average wager used by the player, and will change the status of the player's qualification for a bonus win as necessary. Upon the qualification of the player for a bonus win, and if a bonus win condition occurs, then the control program will process such bonus win, and will credit the player an appropriate amount corresponding to the resulting winning combination(s).

It should be noted that the use of pay lines in the above disclosure is made to describe the operation of the preferred embodiment, and is not intended to limit the current invention. As would be appreciated by a person skilled in the art, the concepts disclosed herein could also be used with a slot machine that does not employ winning lines or pay lines. For example, in a slot machine wherein a winning combination is defined by the multiple occurrences of a symbol at adjacent columns, the presentation of spin information to the player could be made in two steps. In the first step, partial information related to the symbols occurring at various reels after a spin is made visible to the player. Then, in a second step, the remaining information related to said spin is presented to the player. The player is permitted to change the wager for the game after the first step. Partial information could include all occurring symbols after a spin presented at locations that are different from their actual locations, or could be based on a subset of the occurring symbols.

It should also be noted that the use of two steps to describe the main concept in this invention is presented solely to demonstrate the preferred embodiment, and is not intended to limit the invention. As would be appreciated by a person skilled in the art, the presentation of game information to the player could be made in multiple steps, i.e. more than two steps, wherein the player is permitted to increase his or her bet after each step. In such a case, the player is required to place a wager after the first step. Increasing the wager after the second and subsequent steps could be optional. An algorithm to hide partial game information from the player in a multiple steps machine would be similar to an algorithm used in a two step machine. However, the algorithm should be designed such that any winning combination is disclosed at the last step. A variation of this concept could include disclosing winning combinations at intermediate steps with a requirement to increase the wager for the game after a step that discloses a winning combination.

In addition, as will be understood by those skilled in the art, many different programs may be utilized to implement the flow charts disclosed in FIGS. 3-7. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is, therefore, to be understood that all such modifications, variations and improvements have been deleted herein for the sake of conciseness and readability, but are properly within the scope and spirit of the following claims.

What is claimed and desired to be secured by Letters of Patent is:

1. A slot machine for presenting a game, the slot machine comprising:

a wager input device enabling a player to place a wager for a play of the game;

a display device for displaying a display area with a plurality of symbol positions; and a processor configured to:

randomly determine a plurality of symbols for the play of the game;

in a first step, after the plurality of symbols are randomly determined, display all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein the player is not required to place the wager for the play of the game prior to the first step;

after the first step, automatically perform a final step without any player input, the final step including determining final symbol positions for the symbols of the plurality of symbols not included in the subset and relocating the symbols to their respective final symbol positions within the display area to display a final outcome for the play of the game including all of the plurality of symbols at respective final symbol positions within the display area; and awarding only a single payout for the play of the game, the single payout based only on the final step of the game by evaluating the plurality of symbols displayed at their respective final display positions.

2. A slot machine as recited in claim 1, further comprising a housing.

3. A slot machine as recited in claim 2, wherein the display device is a video display that simulates the rotation of a plurality of reels to form the display area.

4. A slot machine as recited in claim 3, wherein the display area comprises one or more pay lines.

5. A slot machine as recited in claim 1, wherein the player is permitted to place the wager prior to the first step and increase the wager after said first step.

6. A slot machine for presenting a game, the slot machine comprising:

means for enabling a player to place a wager for a play of the game;

means for providing a display area with a plurality of symbol positions; and means for controlling the slot machine to:

randomly determine a plurality of symbols for the play of the game;

in a first step, after the plurality of symbols are randomly determined, display all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein the player is not required to place the wager for the play of the game prior to the first step;

after the first step, automatically perform a final step without any player input, the final step including determining final symbol positions for the symbols of the plurality of symbols not included in the subset and relocating the symbols to their respective final symbol positions within the display area to display a final outcome for the play of the game including all of the plurality of symbols at respective final symbol positions within the display area; and awarding only a single payout for the play of the game, the single payout based only on the final step of the game by evaluating the plurality of symbols displayed at their respective final display positions.

7. A slot machine as recited in claim 6, further comprising a housing.

8. A slot machine as recited in claim 6, wherein said means for providing the display area includes a video display that simulates the rotation of a plurality of reels.

9. A slot machine as recited in claim 6, further comprising at least one pay line.

10. A slot machine as recited in claim 6, wherein the player is permitted to at least one of placing the wager after said first step is completed, and increasing the wager after the first step is completed if the wager was placed prior to the first step.

11. A slot machine as recited in claim 6, which does not include pay lines, and which defines a winning combination of symbols to include multiple occurrences of a same symbol in adjacent columns on the display area.

12. A video slot machine for presenting a game, the slot machine comprising:

a housing;

a wager input device enabling a player to place a wager for a play of the game;

a display device that employs simulated rotating reels for displaying a display area with a plurality of symbol positions; and a processor configured to:

randomly determine a plurality of symbols for the play of the game;

in a first step, after the plurality of symbols are randomly determined, display all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein the player is not required to place the wager for the play of the game prior to the first step;

after the first step, automatically perform a final step without any player input, the final step including determining final symbol positions for the symbols of the plurality of symbols not included in the subset and relocating the symbols to their respective final symbol positions within the display area to display a final outcome for the play of the game including all of the plurality of symbols at respective final symbol positions within the display area; and awarding only a single payout for the play of the game, the single payout based only on the final step of the game by evaluating the plurality of symbols displayed at their respective final display positions.

13. A video slot machine as recited in claim 12, further comprising at least one pay line.

14. A video slot machine as recited in claim 12, which does not include pay lines, and which defines a winning combination of symbols to include multiple occurrences of a same symbol in adjacent columns on the display area.

15. A video slot machine as recited in claim 12, wherein the player is permitted to at least one of placing the wager after said first step is completed, and increasing the wager after the first step is completed if the wager was placed prior to the first step.

16. A video slot machine for presenting a game, the slot machine comprising:

a housing;

a wager input device enabling a player to place a wager for a play of the game;

a display device that employs simulated rotating reels for displaying a display area with a plurality of symbol positions; and a processor configured to:

randomly determine a plurality of symbols for the play of the game;

in a first step, after the plurality of symbols are randomly determined, display all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein the player is permitted to at least one of placing the wager after the completion of the first step, and increasing the wager after the completion of the first step if the wager was placed prior to the first step;

after the first step, automatically perform a final step without any player input, the final step including determining final symbol positions for the symbols of the plurality of symbols not included in the subset and relocating the symbols to their respective final symbol positions within the display area to display a final outcome for the play of the game including all of the plurality of symbols at respective final symbol positions within the display area; and awarding only a single payout for the play of the game, the single payout based only on the final step of the game by evaluating the plurality of symbols displayed at their respective final display positions.

17. A video slot machine as recited in claim 16, further comprising at least one pay line.

18. A video slot machine as recited in claim 16, which does not include pay lines, and which defines a winning combination of symbols to include multiple occurrences of a same symbol in adjacent columns on the display area.

19. A video slot machine as recited in claim 16, further comprising a bonus game.

20. A method for a slot machine for presenting a game, the slot machine including a wager input device to enable a player to place a wager for a play of the game, a display device for displaying a display area with a plurality of symbol positions, and a processor for controlling the slot machine, comprising the steps of:

randomly determining a plurality of symbols for the game, in a first step, after the plurality of symbols are randomly determined, displaying all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein after the plurality of symbols are displayed by the first step, the player is permitted to at least one of placing the wager, and increasing the wager if the wager was placed prior to the first step;

after the first step, automatically determining in a final step, without any player input, the final symbol positions for the symbols of the plurality of symbols not included in the subset and relocating the symbols to their respective final symbol positions within the display area to display a final outcome for the play of the game including all of the plurality of symbols at respective final symbol positions within the display area; and awarding only a single payout for the play of the game, the single payout based only on the final step of the game by evaluating the plurality of symbols displayed at their respective final display positions.

21. A slot machine for presenting a game, the slot machine comprising:

a wager input device enabling a player to place a wager for a play of the game;

means for displaying a display area with a plurality of symbol positions; and a processor configured to:

randomly determine a plurality of symbols for the play of the game;

in a first step, after the plurality of symbols are randomly determined, display all of the plurality of symbols within all of the symbol positions, wherein only a subset of the plurality of symbols are displayed at final symbol positions, while the symbols of the plurality of symbols not included in the subset are displayed at symbols positions that are different from their respective final symbol positions within the display area, wherein after completion of the first step the player is permitted to at least one of placing the wager, and increasing the wager if the wager was placed prior to the first step;

after the first step, automatically perform a final step without any player input, the final step including determining final symbol positions for the symbols of the plurality of symbols not included in the subset and relocating the symbols to their respective final symbol positions within the display area to display a final outcome for the play of the game including all of the plurality of symbols at respective final symbol positions within the display area;

awarding only a single payout for the play of the game, the single payout based only on the final step of the game by evaluating the plurality of symbols displayed at their respective final display positions; and initiate a bonus game if the conditions for said bonus game are met.

* * * * *